United States Patent
Arioka et al.

(10) Patent No.: US 6,754,166 B2
(45) Date of Patent: Jun. 22, 2004

(54) OPTICAL RECORDING MEDIUM AND OPTICAL RECORDING METHOD

(75) Inventors: Hiroyuki Arioka, Tokyo (JP); Kazuki Suzawa, Tokyo (JP)

(73) Assignee: TDK Corporation, Tokyo (JP)

( * ) Notice: Subject to any disclaimer, the term of this patent is extended or adjusted under 35 U.S.C. 154(b) by 272 days.

(21) Appl. No.: 10/106,712

(22) Filed: Mar. 27, 2002

(65) Prior Publication Data

US 2003/0039191 A1 Feb. 27, 2003

Related U.S. Application Data

(60) Provisional application No. 60/279,749, filed on Mar. 30, 2001.

(51) Int. Cl.[7] .................................................. G11B 7/00
(52) U.S. Cl. .................... 369/275.1; 369/59.1; 369/47.1
(58) Field of Search ............................... 369/47.1, 47.5, 369/47.51, 47.54, 53.1, 53.41, 59.1, 59.11, 59.12, 59.26, 275.1, 275.3, 275.4

(56) References Cited

U.S. PATENT DOCUMENTS

| | | | | |
|---|---|---|---|---|
| 5,978,335 A | * | 11/1999 | Clark et al. ............... | 369/53.34 |
| 6,690,640 B1 | * | 2/2004 | Van Den Enden ....... | 369/275.4 |
| 2001/0036143 A1 | | 11/2001 | Ohono et al. | |

FOREIGN PATENT DOCUMENTS

| JP | 61-211835 | 9/1986 |
|---|---|---|
| JP | 62-164590 | 7/1987 |
| JP | 1-154328 | 6/1989 |
| JP | 1-182846 | 7/1989 |
| JP | 2-278535 | 11/1990 |
| JP | 2-504196 | 11/1990 |
| JP | 3-228227 | 10/1991 |
| JP | 4-044642 | 2/1992 |
| JP | 5-205276 | 8/1993 |
| JP | 8-077599 | 3/1996 |
| JP | 2634827 | 4/1997 |
| JP | 10-027396 | 1/1998 |
| JP | 10-134353 | 5/1998 |

* cited by examiner

*Primary Examiner*—Muhammad Edun
(74) *Attorney, Agent, or Firm*—Oliff & Berridge PLC

(57) ABSTRACT

The irradiation time and/or the irradiation power of a laser beam is varied to perform multi-level recording on a recording layer in five stages or more. On the recording layer 12 of an optical recording medium 10, defined contiguously are virtual recording cells 40 within a groove 16 along tracks arranged at track pitches of 1 to 1.5 $\mu$m. The time and/or the irradiation power of the laser beam is modulated in five stages or more corresponding to the information to be recorded on each of the virtual recording cells 40 in order to form recording marks 48A–48G having five stages or more of different sizes and/or optical transmittance. The overall optical reflectivity of each of the virtual recording cells 40 is modulated in multi-stages to vary in five stages or more the entire reflectivity level of the reading laser beam used upon reading in the virtual recording cell including the outside of the recording mark.

14 Claims, 7 Drawing Sheets

OPTICAL RECORDING MEDIUM AND OPTICAL RECORDING METHOD

This application claims the benefit of Provisional Application No. 60/279,749 filed on Mar. 30, 2001.

DETAILED DESCRIPTION OF THE INVENTION

1. Field of the Invention

The present invention relates to an optical recording medium and an optical recording method. The present invention allows the optical recording medium to be irradiated with a laser beam at an irradiation time and/or an irradiation power, which is changed in multi-stages in response to data made available for recording, to form a recording mark corresponding to the irradiation power and/or irradiation time and thereby perform multi-level recording of the data.

2. Description of the Prior Art

There are a number of methods for recording data on a prior-art optical recording medium by changing the length of a recording mark (the length of a reflected signal modulating portion) in multi-stages. In contrast, a number of studies have also been made on a method for recording a plurality of data on regions of the same length by changing the depth of the recording mark (the degree of modulation of a reflected signal) in multi-stages.

According to this optical recording method, a plurality of data can be recorded in the direction of depth in comparison with the recording of binary data using simply the presence and absence of pits. Thus, this makes it possible to increase the amount of signals to be assigned to a given length, thereby allowing the linear recording density to be improved. Accordingly, such optical recording methods have been suggested which make use of hologram or employ multi layers as the recording layer.

It is herein referred to as multi-level recording to record data in multi-stages using such as variations in depth of reflectivity.

It is necessary to make the recording mark short in order to improve the recording density in such multi-level recording.

However, it is made difficult to perform multi-level recording with the recording mark being made less in diameter than a focused laser beam to be used for recording and reading.

For example, described in Japanese Patent Laid-Open Publication No. Hei 10-134353 is that the amount of laser beam is adjusted to perform multi-level recording. In this publication, with dye film or phase changing film being employed as the recording medium, read signals are formed based on a difference in reflection between recorded and non-recorded portions. Therefore, the method according to Japanese Patent Laid-Open Publication No. Hei 10-134353 relates the non-recorded stage and recorded stage to the absence and presence of records, thus being not suitable for multi-level recording. More specifically, the phase changing film and the dye film provide no intermediate state between the recorded and non-recorded states.

On the other hand, for example, disclosed in Japanese Patent Laid-Open Publication No. Hei 1-182846 is an optical recording medium that allows the optical absorbance of reactants in the recording layer to vary digitally when an amount of light is incident digitally on the recording layer.

However, this optical recording medium is expected to have an extremely small absolute value of variations in optical absorbance for the amount (the number of times) of irradiation of laser beam and thus has not yet been put to actual use.

Furthermore, disclosed in Japanese Patent Laid-Open Publication No. Sho 61-211835 is an optical recording method for changing the intensity or the number of times of irradiation of beam, with which a photochromic material is irradiated, to perform recording in given different stages of coloring density states.

However, there is a problem that this optical recording method cannot read the coloring density states in five stages or more upon irradiation with laser beam for reading.

On the other hand, a double density CD (DDCD) has been suggested which is a CD with an increased storage capacity. The DDCD is 12 cm in diameter, which is the same as the CD, and formatted to provide one side thereof with a capacity of 1.3 GB and thus a recording density twice as high as that of the CD.

In addition, the DDCD makes as-is use of a laser beam of wavelength 780 nm that is used by the current CD, condensing the beam with a high NA lens to reduce the recording mark in size.

According to the DDCD specifications, the track has a pitch as narrow as 1.1 μm in comparison with 1.6 μm of the current CD and is thus provided with a higher density. In addition, as a matter of course, the recording mark is reduced in size, as the shortest recording mark was conventionally 0.833 μm in length but now is 0.623 μm while the longest recording mark is about 2 μm.

Accordingly, the DDCD can be readily implemented by making partial additions or modifications to the parts or firmware of the current CD. This allows the DDCD to feature almost no increase in fabrication costs. The DDCD is expected to find its use with personal computers as their external storage devices or the like.

However, suppose that each aforementioned type of storage medium and recording method is applied to the DDCD. As mentioned above, this would provide insufficient multi-level recording and require substantial changes to the parts and firmware of the current CD, presenting a problem of an increase in fabrication costs.

Furthermore, suppose that the binary recording method or a conventional recording method is performed on the recording medium narrower in track pitch than the conventional one. This would raise a problem that the same recording method as that of the current CD provides a so-called teardrop shaped recording mark due to heat accumulated upon recording. Thus, the recording mark having the aforementioned longest length or a length close to that is to have a teardrop shape with a tail end greater in width than the head end even when the recording laser beam spot is reduced in diameter to all manner of sizes.

As described above, the DDCD has a narrowed track pitch. This causes the teardrop shaped recording mark to produce a cross-talk signal from neighboring tracks and a cross-write phenomenon by which recording marks written on neighboring tracks are deformed. With the phase changing recording layer, this also causes a cross-erase phenomenon to increase and a so-called inter-symbol interference to increase by which the waveform of a read signal is subjected to an interference and distorted between the recording marks on neighboring tracks. Thus, the DDCD presents these new problems.

The inventor has found that multi-level recording can be performed in five stages or more by changing the time for irradiation with a laser beam even under the condition that the length of a recording mark is less than the diameter of a focused beam. The inventor filed a patent application of the invention (which has not yet been laid opened at the filing date of the application of the present invention).

The present invention made it possible to perform the aforementioned multi-level recording with the phase changing material and the dye material being employed as the material for the recording film.

In addition, the inventor made an attempt to perform multi-level recording in five stages or more by changing the time and/or power of irradiation of the laser beam.

SUMMARY OF THE INVENTION

It is therefore an object of the present invention to provide an optical recording medium and an optical recording method that make use of an optical recording medium such as a CD-R (CD—Recordable) and CD-RW (CD—Rewritable), which are generally in wide actual use. The medium and method are adapted to perform multi-level recording in multi-stages without substantially modifying the parts and the firmware of the recorder, thereby making it possible to provide signals of good quality.

It is another object of the present invention to provide an optical recording medium and an optical recording method which prevent the recording mark from taking a teardrop shape in the DDCD-R (DDCD—Recordable) and DDCD-RW (DDCD—Rewritable). It is thereby made possible to perform recording at a predetermined recording density without increasing cross-talk signals, cross-write, cross-erase, and inter-symbol interference.

The inventor has made intensive studies on optical recording media and found a recording method for performing multi-stage recording on an organic dye recording layer. Thus, the inventor has confirmed that the recording method makes it possible to perform five stages or more of multi-level recording on an optical recording medium having an organic dye recording layer. The inventor has also found a recording method for modulating in multi-stages the optical reflectivity of an entire virtual recording region with a given area including a region having a high optical reflectivity around a recording mark. The inventor has confirmed that the recording method makes it possible to perform five stages or more of high-density multi-level recording on an optical recording medium. In particular, it has been confirmed that a good multi-level recording can be performed by setting virtual recording cells (region) contiguously in a direction of relative displacement between the laser beam and the recording layer. The virtual recording cells are provided with an arbitrary unit length in the displacement direction and a unit width in the direction orthogonal thereto, and set along a track having a track pitch defined to be 1 to 1.5 $\mu$m in the orthogonal direction.

In other words, the present invention described below has made it possible to achieve the aforementioned objects.

(1) An optical recording medium for recording information by irradiating a recording layer with a laser beam to form a recording mark thereon and for reading recorded information by irradiating the recording mark with a reading laser beam, said optical recording medium comprising a virtual recording cell set contiguously on said recording layer along a track in a direction of relative displacement between the laser beam and said recording layer, the virtual recording cell being provided with a given unit length in the direction and a unit width in a direction orthogonal thereto, the track being provided with a track pitch defined to be 1 $\mu$m to 1.5 $\mu$m in the orthogonal direction, wherein a recording mark can be formed on said recording layer in the virtual recording cell, said recording mark having at least different one of a size and an optical transmittance corresponding to five stages or more of modulation of an irradiation time and/or irradiation power of the laser beam, and optical reflectivity of the entire virtual recording cell is modulated to thereby enable multi-level recording of information in five stages or more in accordance with at least one of an area ratio of the recording mark to the virtual recording cell and an optical transmittance of the recording mark.

(2) The optical recording medium according to (1), wherein the unit length of said virtual recording cell is set to be generally equal to the length of a recording mark formed by a laser beam irradiation at a maximum time and/or a maximum irradiation power.

(3) The optical recording medium according to (1) and (2), wherein a groove for guiding a laser beam is provided along said recording layer, said virtual recording cell is set in said groove, and said unit width is set to be generally equal to the width of said groove.

(4) The optical recording medium according to any one of (1) to (3), wherein said unit length of said virtual recording cell is made equal to or less than a beam waist of said reading laser beam.

(5) The optical recording medium according to any one of (1) to (4), wherein multi-level recording of information is performed in advance on a portion of said recording layer.

(6) The optical recording medium according to any one of (1) to (5), wherein particular information indicative of being a multi-level recording medium is recorded on at least one of said virtual recording cell, a portion having the multi-level recording performed thereon and a wobble.

(7) The optical recording medium according to any one of (1) to (6), wherein a groove for guiding a laser beam is provided along said recording layer, and the groove is partly discontinued.

(8) The optical recording medium according to any one of (1) to (7), wherein said recording layer is formed of an organic dye.

(9) The optical recording medium according to any one of (1) to (8), wherein the unit width of said virtual recording cell is so set as to allow recording to be performed on the recording layer when the recording layer is irradiated with a laser beam of wavelength 780 nm via an objective lens having a numerical aperture of 0.55 or more with said spot diameter being 1.2 $\mu$m or less.

(10) The optical recording medium according to any one of (1) to (9), wherein said virtual recording cell is arranged in a spiral fashion with a track pitch being from 1 $\mu$m to 1.5 $\mu$m and formed in a disc shape as a whole.

(11) An optical recording method for recording information by irradiating a recording layer with a laser beam, while one of the recording layer and the laser beam is displaced in a given direction relative to the other, to form a recording mark, comprising the steps of: defining a virtual recording cell being set contiguously on said recording layer in the direction of relative displacement, the virtual recording cell being set to be generally equal to the width of a groove formed at a track pitch of 1 $\mu$m to 1.5 $\mu$m in a direction orthogonal to the direction of displacement, modulating the irradiation power of the laser beam in five stages or more for each virtual recording cell, and performing multi-level recording of information by changing a size of the recording mark formed within the virtual recording cell to modulate the optical reflectivity of said entire virtual recording cell in accordance with the irradiation time and/or the irradiation power of said laser beam, said optical reflectivity being provided by at least one of an area ratio of the recording mark to the virtual recording cell and an optical transmittance of the recording mark.

(12) The optical recording method according to (11), wherein said recording layer is formed of a material for allowing at least one of the size and optical transmittance of the recording mark to be modulated only in accordance with the irradiation time provided when said beam diameter of the laser beam is made generally constant, and said recording layer is irradiated with the laser beam having a constant beam diameter.

(13) The optical recording method according to (11), wherein said recording layer is formed of a material for allowing at least one of the size and optical transmittance of the recording mark to be modulated only in accordance with the irradiation power provided when said beam diameter of the laser beam is made generally constant, and said recording layer is irradiated with the laser beam having a constant beam diameter.

(14) The optical recording method according to (11), (12) or (13), wherein said laser beam is a beam of light provided with a wavelength of 780 nm, and said recording layer is irradiated with said laser beam via an objective lens having a numerical aperture of 0.55 or more.

For example, in this invention, for the recording mark being made less than the recording beam diameter, the laser irradiating time and the recording power is modulated with the other thereof being kept at constant. At least one of the size of the recording mark and the optical transmittance is thereby modulated to vary in multi-stages the level of the optical reflectivity provided by the area percentage of the recording mark within a given region, thereby making it possible to perform multi-level recording.

Furthermore, this effect was particularly distinct upon performing five stages or more of multi-level recording.

In addition, for this multi-level recording, the multi-stage recording is discriminated from a difference in the level of the optical reflectivity provided by the area percentage of the recording mark within a given region. This makes it possible to increase the recording density and perform recording of the same recording capacity without using long recording mark, thereby reducing the f-longest recording mark in length.

DETAILED DESCRIPTION OF THE PREFERRED EMBODIMENTS

Figure 1:
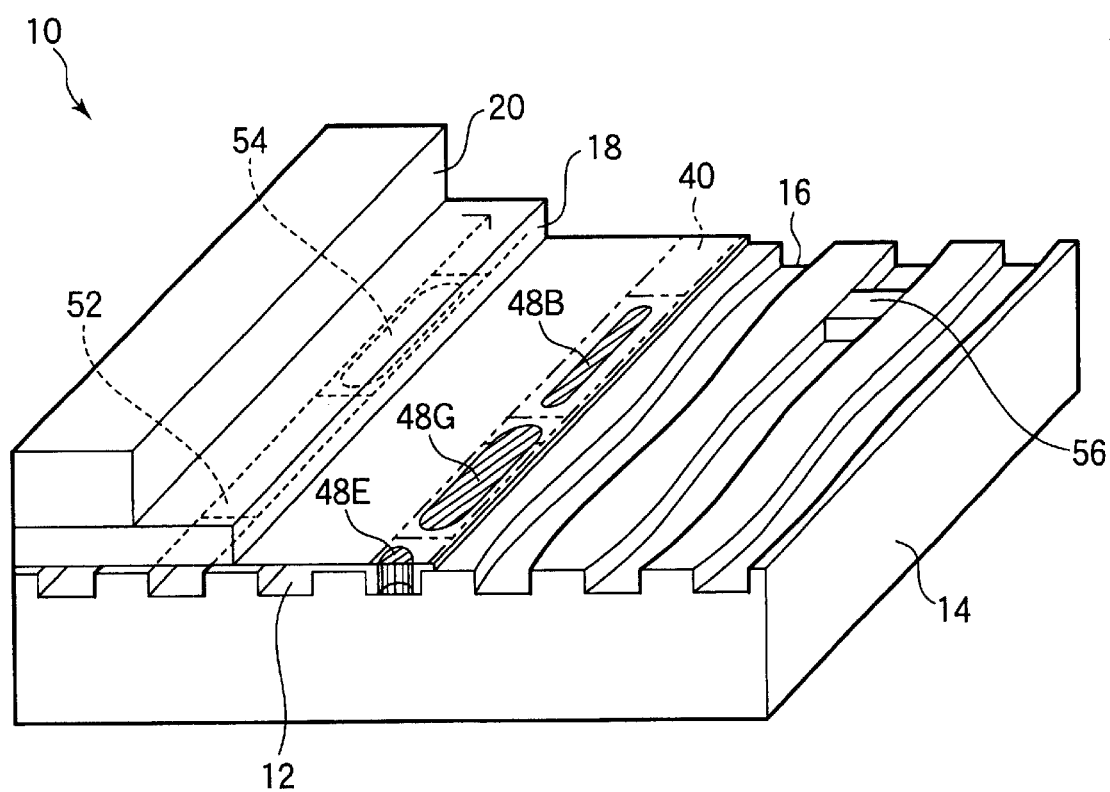
FIG. 1 is a partially sectional perspective view illustrating the main portion of an optical recording medium according to an embodiment of the present invention.

Now, embodiments of the present invention will be explained below in more detail with reference to the accompanying drawings.

An optical recording medium 10 according to an embodiment of the present invention is a DDCD-R (DDCD—Recordable) with the aforementioned format using dye for recording layers 12 and a DDCD-RW employing a phase changing material for the recording layers 12. The optical recording medium 10 includes a substrate 14 formed of a transparent base material, the aforementioned recording layer 12 formed of dye applied to cover grooves 16, formed on one side of the substrate 14 (on the upper surface in FIG. 1), for guiding a laser beam. The optical recording medium also includes a reflective film 18, such as of gold, silver or the like, formed by sputtering or the like on the upper side of the recording layer 12. The optical recording medium is further formed including a protective layer 20 covering the exterior of the reflective film 18. Alternatively, the optical recording medium is formed of a lower protective layer (a dielectric layer) that is formed at least by depositing a film to cover the groove 16, a recording layer formed of a phase changing material, an upper protective layer (a dielectric layer), and an optical reflective layer, and the protective layer 20 for covering those layers. The dyes employed for the aforementioned recording layer 12 include organic dyes such as cyanine, mero-cyanine, methine-based dye and its derivative, benzene thiol metal complex, phthalocyanine dye, naphthalo-cyanine dye, azo dye or the like. The phase changing materials generally include GeSbTe-based materials, AgInSbTe-based materials or the like.

An optically transparent substrate applicable to the present invention can be arbitrarily selected from various materials used for prior-art optical recording media. For example, applicable are polycarbonate resin, polymethyl methacrylate resin, epoxy resin, amorphous polyolefine resin, polyester resin or the like. From the viewpoints of moisture resistance, size stability, and price, the polycarbonate resin may be preferably employed. On this optically transparent substrate, it is preferable to form tracking grooves or recesses and projections (pre-grooves or pits) indicative of information such as address signals. It is possible to obtain the recesses and projections by performing injection molding or extrusion molding on a resin material such as a polycarbonate resin to transfer the recesses and projections of a mother die (stamper).

The information of the recesses and projections include various pieces of information for recording and reading data on the optical recording medium in a more appropriate manner. Upon forming the optically transparent substrate, it is possible to record the information in advance by transferring the information from the aforementioned stamper and thereby form a plurality of pits having different depths. Alternatively, it is possible to record the information by performing multi-level recording after the optical recording medium has been manufactured. The aforementioned various information includes information required for recording and reading such as ID information for individually identifying the optical recording medium. The aforementioned various information also includes optical recording medium type identifying information for identifying the optical recording medium as a type of optical recording medium used for multi-level recording, and information for determining the power of a laser beam for recording and reading data on the optical recording medium. Also included are time information on the contents provided by multi-level recording, address information indicative of the location of the information in the optical recording medium and the contents recorded therein, and index information. Upon recording and/or reading data on the optical recording medium, it is possible to make use of these pieces of information. Incidentally, in the case of a disc-shaped medium, more than one piece of the information may be provided near the innermost circumference, near the outermost circumference, or on the disc in accordance with a given rule.

The dyes used for the aforementioned recording layer 12 include an organic dye such as cyanine, mero-cyanine, methine-based dye and its derivative, benzene thiol metal complex, phthalocyanine dye, naphthalo-cyanine dye, azo dye or the like.

The solvents for organic dye coating solutions available are esters such as butyl acetate and cellosolve acetate; ketones such as methyl ethyl ketone, cyclohexanone, and methyl isobutyl ketone; chlorinated hydrocarbons such as dichloromethane, 1,2-dichloroethane, and chloroform; amides such as dimethylformamide; hydrocarbons such as cyclohexane; ethers such as tetrahydrofuran, ethyl ether, and dioxane; alcohols such as ethanol, n-propanol, isopropanol, n-butanol, and diacetone alcohol; a fluorine-based solvent such as 2,2,3,3-tetrafluoropropanol; glycol ethers such as ethylene glycol monomethyl ether, ethylene glycol monoethyl ether, and propylene glycol monomethyl ether. These solvents can be used alone or by mixing each other in consideration of the solubility or the like of the organic dye to be used. Various types of additives such as a singlet oxygen quencher, an antioxidant, an UV absorbent, a plasticizer, and a lubricant may be further added to the coating solution as required.

In general, the organic dye coating solution prepared as such has a concentration of 0.01 to 10 wt %, preferably 0.1 to 5 wt %. Coating methods include the spraying method, the spin coating method, the dipping method, the roll coating method, the blade coating method, doctor roll method, or the screen printing method. Among these method, the spin coating method is preferably employed for forming the organic dye recording layer in general to be 20 to 500 nm in thickness when dried.

An optically reflective layer is provided on the aforementioned organic dye recording layer. As an optically reflective substance forming the optically reflective layer, a substance having a high reflectivity for a beam of laser light is preferably employed. As an example, the optically reflective substances include elements such as Au, Ag, Cu, Al, Ni, Pd, Pb, Pt, Cr, Ni, and Pt. These elements are used alone or as an alloy and formed by sputtering or vacuum deposition. The optically reflective layer is 10 to 800 nm in thickness in general, preferably 50 to 300 nm.

On the optically reflective layer, a protective layer is provided to physically and chemically protect the organic dye recording layer or the optically reflective layer or the like. This protective layer may be provided to improve scratch resistance or moisture resistance on the side of the optically transparent substrate where the organic dye recording layer is not provided. In general, an ultraviolet curable resin is widely used for the protective layer. The ultraviolet curable resin is used as it is or dissolved into an appropriate solvent to prepare and coat a coating solution, and then irradiated with ultraviolet light to be thereby cured. Various types of additives such as an antistatic agent, an antioxidant, and an UV absorbent may be further added to the coating solution as required. The protective layer is about 0.1 to 100 $\mu$m in thickness.

The optical recording medium employed for the present invention may be of a single plate type having the aforementioned configuration. Alternatively, two optical recording media having the aforementioned configuration can be adapted to sandwich and bond the protective layer with adhesive or the like, thereby forming an optical recording medium of a bonded type. On the other hand, such an optical recording medium of a bonded type can also be formed which is obtained by bonding the two optical recording media, at least one of which has the aforementioned configuration.

A method for recording data onto the optical recording medium obtained as such is carried out as follows. That is, for example, such a semiconductor laser beam is employed as recording beam that has a frequency range from 770 to 790 nm (780 nm band) or from 630 to 660 nm. While the optical recording medium is being rotated at a constant linear velocity or at a constant angular velocity, the organic dye recording layer is irradiated with a laser beam suitable for the layer, thereby providing a physically and chemical change in the organic dye. A method for reading data on the optical recording medium is carried out as follows. That is, a difference in optical reflectivity is read which is based on the reflectivity of the entire virtual recording cell 40, or based on the percentage of a chemically changed portion of the organic dye in the virtual recording cell 40 and the optical transmittance of the portion.

The present invention further converts an input signal, which changes in response to the data made available for recording, into five stages or more of modulation signals by a modulation signal generator. The modulation signal is sent to a laser driver and the laser beam is changed in the laser irradiation time into five stages or more, or, the modulation signal is sent to a modulator and the laser beam is changed in the power into five stages or more to impinge on the optical recording medium for recording. This allows (the difference in optical reflectivity at each virtual recording cell) to serve to record in multi-levels the five stages or more of information on a given length of recording portion. Thus, it is made possible to change in five stages or more the amount of reflected light obtained by the laser beam with which the optical recording medium is irradiated upon reading. That is, while being rotated at a constant linear velocity or at a velocity angular speed, the optical recording medium having information recorded in multi-levels is irradiated with a laser beam having a power less than one used upon recording, preferably 1 mW or less. Then, reflected light is detected to make it possible to carry out reading. Thus, this dramatically increases the amount of information per unit length and per unit area as well.

In addition, the optical recording medium is provided in advance with a plurality of pits having the number of depths to the number of stages of the power of the laser beam or multi-level recording is performed in advance on a portion of the optical recording medium. On these plurality of pits and/or the portion on which the multi-level recording has been performed, provided as particular information are information for individually identifying the recording medium and information for identifying the recording medium as an optical recording medium for multi-level recording. Also provided is information for determining the power of a laser beam for recording and reading data on the recording medium. The particular information is read upon reading and/or recording data on the optical recording medium to thereby positively identify the optical recording medium as one for multi-level recording. It is further made possible to individually identify the optical recording medium and determine the number of stages of the power of the laser beam in response to the number of stages of pits which have been recorded in advance. This makes it possible to provide more positive multi-level recording and reading.

Figure 2:
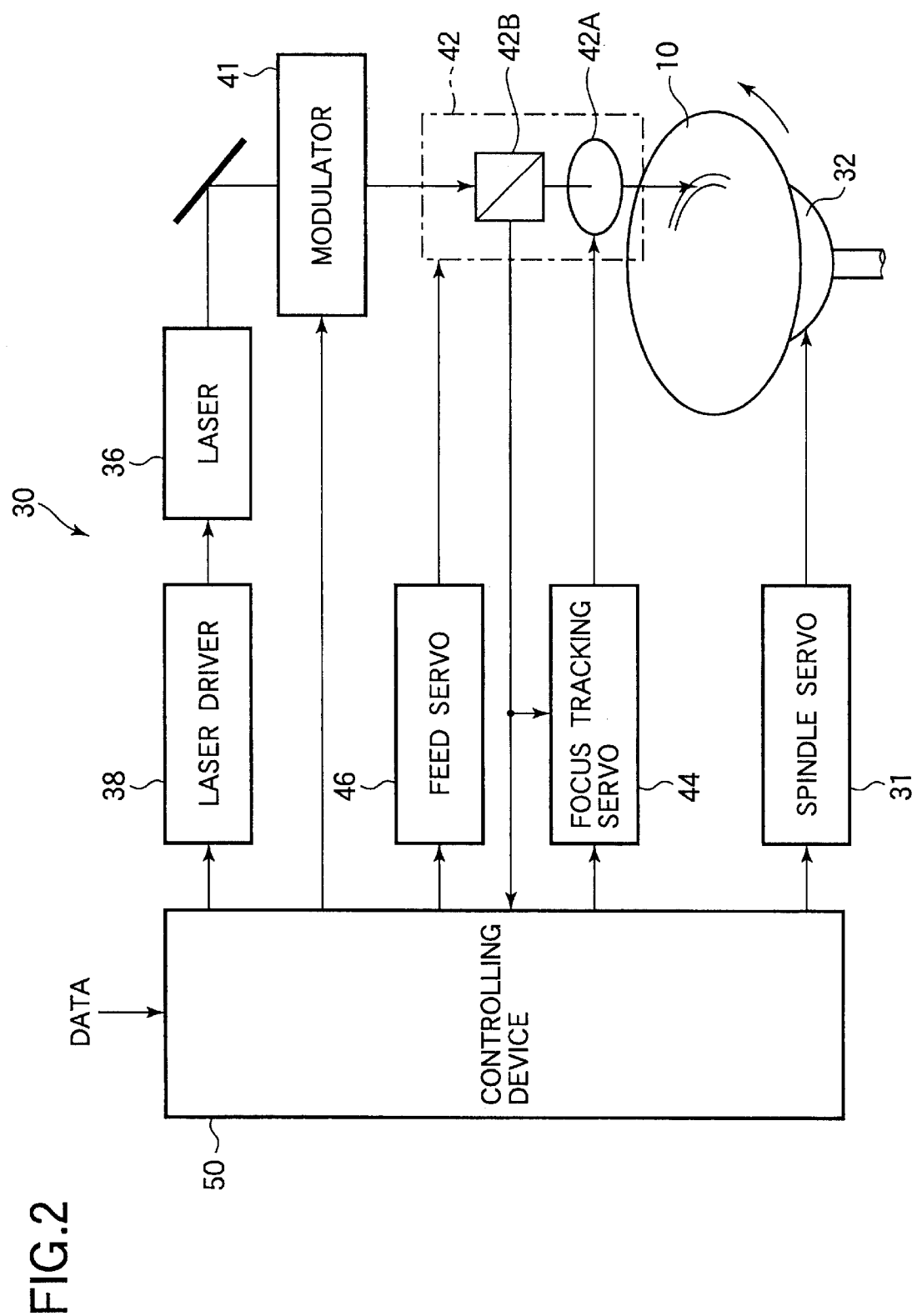
FIG. 2 is a block diagram illustrating an optical recording device for recording information using a laser beam onto the optical recording medium.

An optical recording device 30 shown in FIG. 2 performs multi-level recording on the aforementioned optical recording medium 10.

The optical recording device 30, a DDCD-R recorder, allows a spindle motor 32 to rotatably drive the optical recording medium (disc) 10 via a spindle servo 31 under the condition of a constant linear velocity in order to irradiate the optical recording medium (disc) 10 with a laser beam from a laser 36 and thereby record information onto the recording layer 12 formed as described above.

A laser driver 38 drives the aforementioned laser 36 to output a laser beam. In response to the information to be recorded, when the irradiation power of the laser beam is constant, the laser driver 38 is adapted to control (modulate) electrically the irradiation time (number of laser pulse for example) of the laser beam incident on one virtual recording cell 40 (described later) shown in FIGS. 1, 3 and 4. When the irradiation time of the laser beam is constant, in addition to the aforementioned laser driver 38 for electrical control such as voltage modulation, a modulator 41 may be employed for varying the amount of transmitted light. As the modulator 41, use is made of an acoustic optical modulator or an electrical optical modulator. Furthermore, such a modulator may also be used which varies the amount of transmitted light in accordance with the percentage of overlap between two polarizing elements having different polarizing directions. The irradiation time and the irradiation power of the laser beam may be controlled simultaneously.

Reference numeral 42 of FIG. 2 designates a recording optical system including an objective lens 42A and a half mirror 42B. The objective lens 42A is controlled by means of the focus tracking control of a focus tracking servo 44 in a manner such that a laser beam is focused on the recording layer 12. In addition, the objective lens 42A and the half mirror 42B are controlled by means of a feed servo 46 in phase with the rotation of the disc 10 to move from the inner to outer circumference at a predetermined speed. The aforementioned spindle servo 31, the laser driver 38, the focus tracking servo 44, and the feed servo 46 are controlled by means of a controlling device 50. The data (information) to be recorded onto the recording layer 12 is inputted to the controlling device 50.

Now, the aforementioned virtual recording cell 40 and a recording mark to be recorded on the virtual recording cell 40 are described below.

The virtual recording cell 40 is defined to have a unit width in the radial direction of the recording medium and a unit length in the direction of the rotation. The unit width is equal to or less than the diameter of the waist of a laser beam (the recording spot diameter D≈1.2 $\mu$m) and is a width such as the track pitch of the disc 10 or the width of a groove that can be arbitrarily selected. Here, the track pitch is a distance between the centers of two neighboring grooves, and defined to be 1 $\mu$m to 1.5 $\mu$m in the radial direction of the disc 10. The groove width is a distance between the centers of two neighboring land portions in the direction of width, in which the land portion is formed between two neighboring grooves.

As shown in FIG. 1, the virtual recording cells 40 according to this embodiment are contiguously defined within the aforementioned grooves 16 in the direction of rotation of the disc 10 or in the circumferential direction. The virtual recording cell 40 is so defined as to have a length (the length in the circumferential direction) shorter than the recording spot diameter D (hereinafter referred to as the beam diameter D) which is provided by focusing a laser beam of wavelength 780 nm with the objective lens 42A having a NA of 0.55 or more. Moreover, the virtual recording cell 40 is also defined to have a width generally equal to that of the groove 16. Each virtual recording cell 40 is irradiated with a laser beam, thereby forming recording marks 48A to 48G, schematically exemplified in FIGS. 3 and 4 as examples, according to the information to be recorded.

Here, the beam diameter D of the laser beam emitted from the aforementioned laser 36 is made greater than the aforementioned virtual recording cell 40 on the recording layer 12. However, selection of the material of the recording layer 12 makes it possible to form optical transmittance modulated regions having different diameters, or the recording marks 48A to 48G at the center of the laser beam in accordance with the laser irradiation time and/or power. Here, although the laser beam is generally circular in shape, the optical recording medium 10 is irradiated with the laser beam while being rotated, thereby causing the movement relative to the optical recording medium 10 to make the laser beam elliptical in shape in the virtual recording cell 40. In addition, the radial width of the laser beam varies in accordance with the laser irradiation time and/or power, being reduced with reduced laser irradiation time and/or power and increased with increased laser irradiation time and/or power. This makes it possible to vary the reflectivity in multi-stages in a sorter virtual recording cell.

Figure 3:
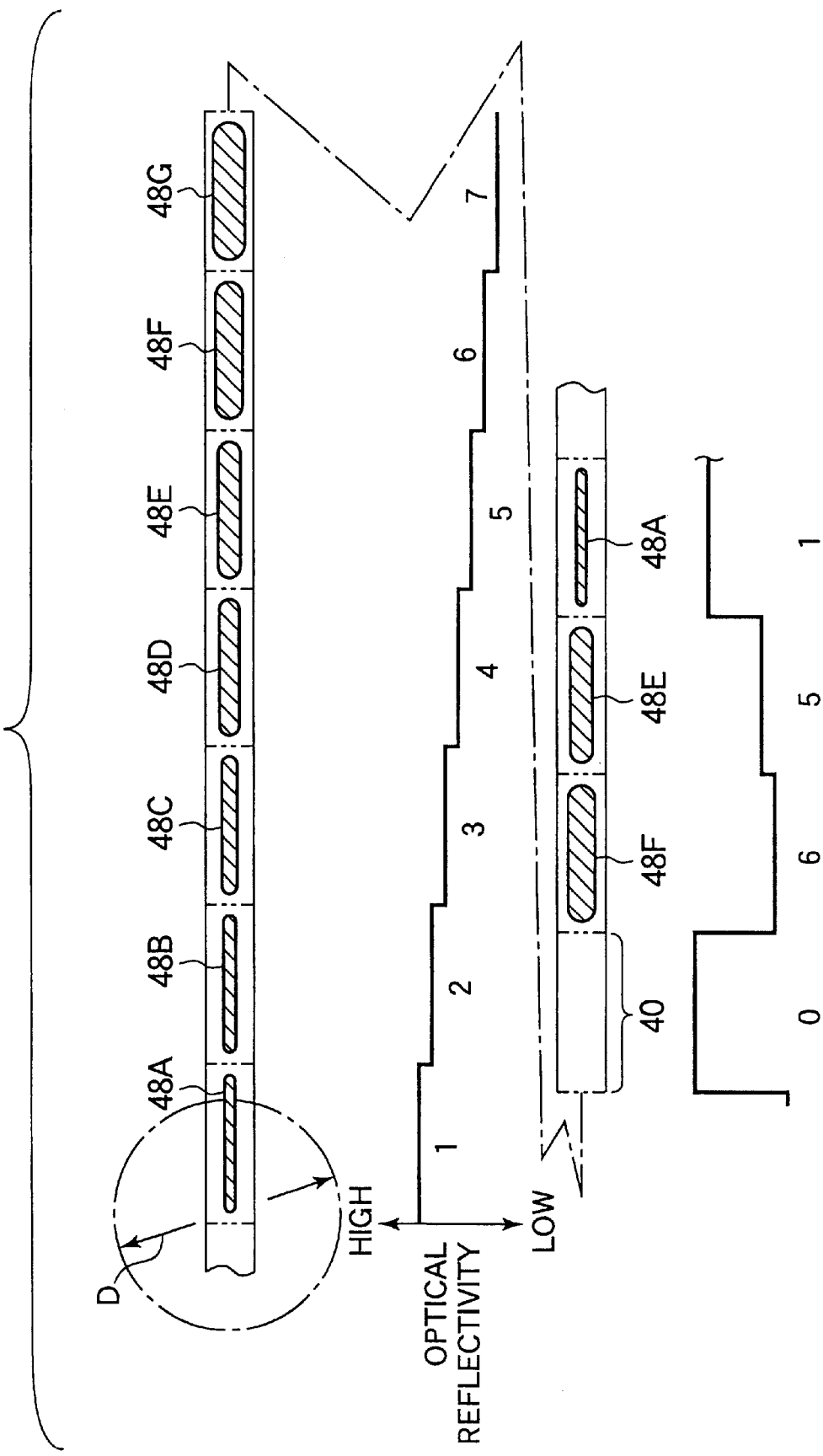
FIG. 3 is a schematic view illustrating the relationship among a recording mark, a virtual recording cell, and their optical reflectivities, upon forming the recording mark onto a recording layer using the optical recording device when the irradiating power of laser beam is varied.
Figure 4:
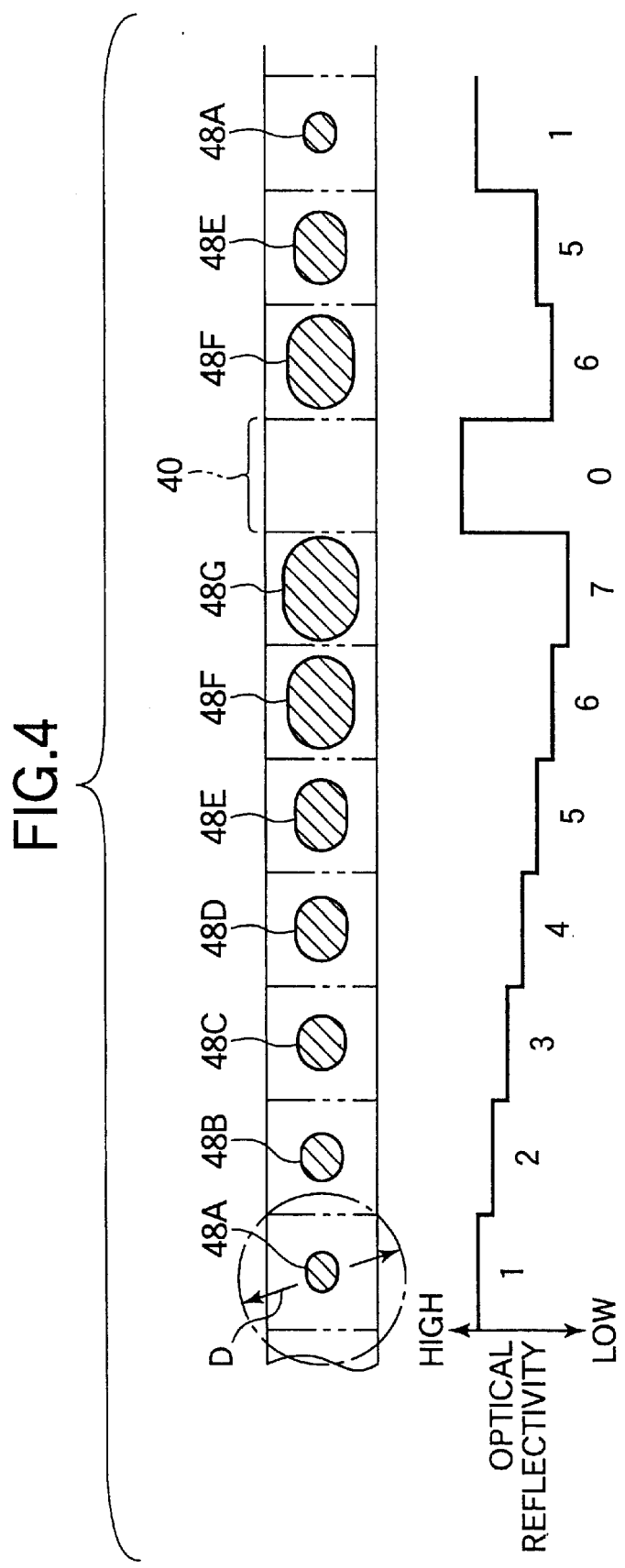
FIG. 4 is a schematic view illustrating the relationship among a recording mark, a virtual recording cell, and their optical reflectivities, upon forming the recording mark onto a recording layer using the optical recording device when the irradiating time of the laser beam is varied.
Figure 5:
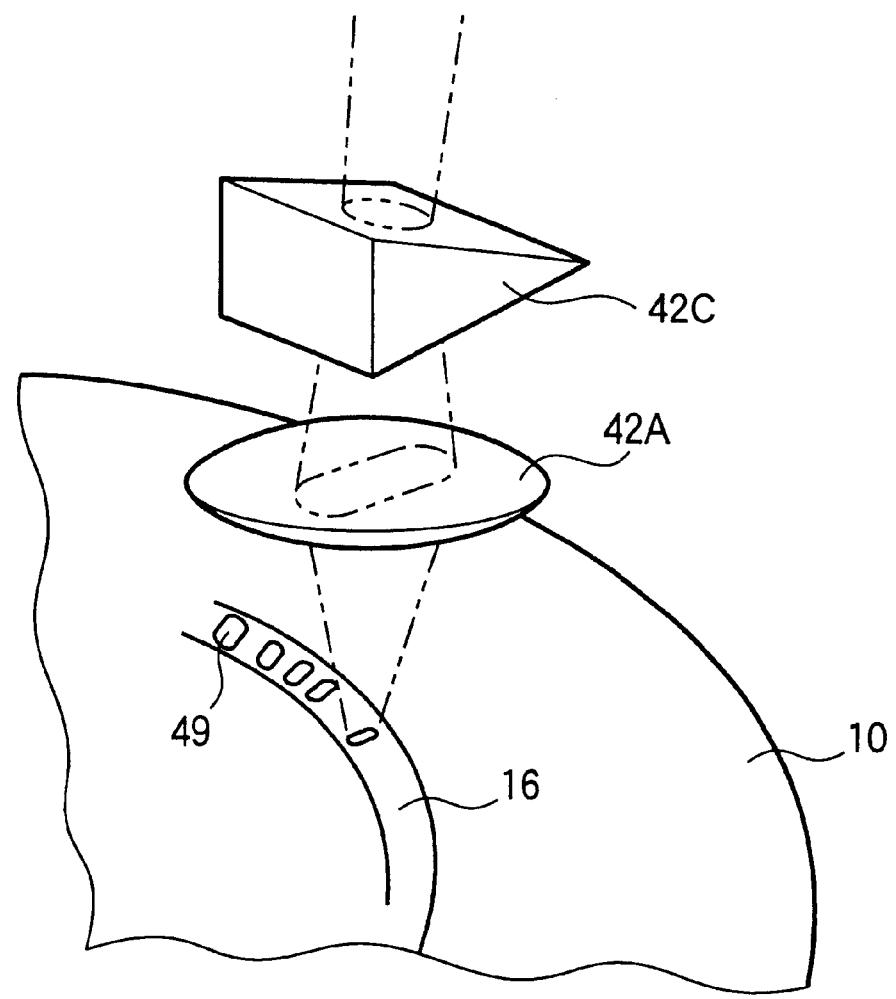
FIG. 5 is a schematic perspective view illustrating a virtual recording cell irradiated with a laser beam having another shape.

This is because of the following reason. A focused laser beam forms in general a Gaussian distribution. However, in the recording layer 12, only the portion of a laser beam having an irradiation energy exceeding a certain threshold value (within the range of the recording spot diameter) carries out recording. Thus, the irradiation time and/or power of the laser beam is varied, thereby varying the spot size of the laser beam at which recording can be performed on the recording layer 12. When the irradiation time is constant and the irradiation power of the laser beam is varied, as shown in FIG. 3 and when the irradiation time is varied and the irradiation power of the laser beam is constant as shown in FIG. 4, for example, these make it possible to form the recording marks 48A to 48G of seven stages.

The unit width of the aforementioned virtual recording cell 40 is made greater than the recording spot diameter that is determined by the wavelength of the laser beam and the numerical aperture of the objective lens 42A. For example, it is adapted that the laser beam has a wavelength band of 780 nm and the objective lens 42A has a numerical aperture of 0.55 or more, with the maximum recording spot diameter being 1.2 μm. In this case, the magnitude of the irradiation energy of the laser beam in a range exceeding the threshold value is set as follows. That is, the size of each of the recording marks 48A to 48G and their optical transmittance are set such that provided in seven stages is the optical reflectivity of the reflected light from the entire portions including a recording mark in the virtual recording cell 40, when irradiated with a reading laser beam, and a non-recorded portion around the recording mark. The aforementioned optical reflectivity increases in magnitude as the recording mark decreases. Thus, the optical reflectivity takes on the maximum reflectivity in the virtual recording cells where no recording marks are formed, while the optical reflectivity takes on the minimum reflectivity in the virtual recording cells where the maximum recording mark 48G is formed.

Describing in more detail, the aforementioned optical reflectivity is set in consideration of the area ratio of each of the recording marks 48A to 48G to the virtual recording cell 40 and the optical reflectivity of the recording mark portion.

The optical transmittance of the recording marks 48A to 48G themselves depends on the material forming the recording layer 12, which is irradiated with a laser beam to be decomposed and changed in quality and refractive index thereof, and the amount of change in the direction of thickness of the recording layer 12. If the recording mark portion formed has zero optical transmittance, this has not to be taken into account.

As described above, the multi-level recording corresponds to the area ratio of each of the recording marks 48A to 48G to the virtual recording cell 40 and the level of optical transmittance of the recording mark itself. This makes it possible to substantially reduce the length of the longest recording mark in comparison with the recording of a signal by mainly corresponding to the length of a recording mark.

In addition, the recording marks become generally elliptical in shape as shown by reference numerals 48A to 48G in FIG. 3. It can therefore be generally avoided to cause a teardrop shaped recording mark to be formed having a width lying off the track. Thus, even for a recording mark with the maximum irradiation time and/or power, it is possible to prevent the occurrence of cross-talk, cross-write, cross-erase, and inter-symbol interference.

The aforementioned embodiment employs a CD-R type disc or CD-RW type disc as the optical recording medium 10. However, the present invention is not limited thereto but widely applicable to other optical recording media.

In addition, in the aforementioned embodiment, the recording layer 12 employs an organic dye such as cyanine or a phase changing material. However, the present invention is not limited thereto and may employ an organic dye other than those mentioned above so long as the organic dye can form recording marks having different sizes in five stages or more corresponding to the irradiation power of the laser beam.

However, with the organic dyes mentioned above, it was possible to positively change the size and the optical transmittance of the recording mark for recording, corresponding to five stages or more of irradiation power of the laser beam.

Furthermore, the aforementioned embodiment is related to the optical recording medium 10 having no information such as data recorded thereon. However, the present invention is not limited thereto and applicable to an optical recording medium on which multi-level recording of information has been performed in five stages or more.

Still furthermore, the size of the virtual recording cell 40 set on the recording layer 12 upon forming a recording mark by the aforementioned optical recording device 30 is not limited to the example of the embodiment and can be a given length equal to or less than the beam waist diameter of the laser beam. Furthermore, an optical recording medium having no groove 16 allows the virtual recording cell 40 to be set in size arbitrarily. However, the size of the virtual recording cell 40 may be so set as to be generally equal in length to the recording mark formed with the irradiation energy at the maximum irradiation time and/or power of the laser beam exceeding the threshold value at which a change is provided to the recording layer 12.

On the other hand, the aforementioned laser beam is made circular in shape on the recording layer 12. However, the beam may be shaped to be short in the direction of feed of the optical recording medium 10 and formed in the shape of an ellipse or a line to be long in the direction orthogonal thereto. For this purpose, in addition to the objective lens 42A, for example, a beam shaping prism 42C may be used as shown in FIG. 4. In this case, a recording mark 49 is made short to allow the virtual recording cell to be further reduced in length. That is, the recording density can be improved.

Furthermore, as shown by reference numeral 52 in FIG. 1, the optical recording medium 10 may be designed to have a plurality of pits having different reflectivity and adapted in number to the stages for signal modulation. Alternatively, the multi-level recording may be performed beforehand as described above on part of the optical recording medium. On these plurality of pits 52 and/or the recording marks 54 on which the multi-level recording has been performed, it is thereby allowed to write particular information such as information for individually identifying the recording medium and information for identifying the recording medium as an optical recording medium for multi-level recording. It is also allowed to write information for determining the irradiation time and/or power of a laser beam for reading and recording on the recording medium. The particular information is read upon reading and/or recording on the optical recording medium to thereby positively identify the optical recording medium as one for multi-level recording. It is also possible to individually identify the optical recording medium and determine the number of stages of the laser beam irradiation time and/or power in accordance with the number of stages of pits having been recorded in advance, thereby making it possible to provide more positive multi-level recording and reading.

Normally, a recording medium for a CD-RW and a DVD-R/RW records a signal by wobbling a recording groove. This signal is referred to as an address signal. To read this signal enables a recording device to move a recording head to a predetermined position.

For example, in the case of a CD-R/RW, a time code of a minute and a second, whereby a position is replaced with a time, is recorded in this address signal. The recording device reads this time code and moves the head to a read-in portion, so that the recording device becomes possible to read various data.

A multi-level optical recording medium according to the present invention is capable of adopting an address signal by wobbling in the case that this multi-level optical recording medium is used (i.e., recorded or reproduced) in a recording device to be applied to a CD-R/RW. However, in this case, a signal system such as an address code or the like, which is different from a normal time code of a CD-R/RW, is adopted. A normal recording device is not capable of reading a peculiar address signal, which is different from that of the CD-R/RW, and is not capable of moving a head to a predetermined position (in this case, the multi-level optical recording medium is discharged from the recording device).

On the other hand, a recording device in association with multi-level recording becomes possible to read a signal by moving the head to the read-in portion, if the peculiar address is set to be capable of being identified.

In other words, it is possible to distinguish a multi-level optical recording medium from other optical recording medium by adopting an address, which is different from a normal address.

Figure 6:
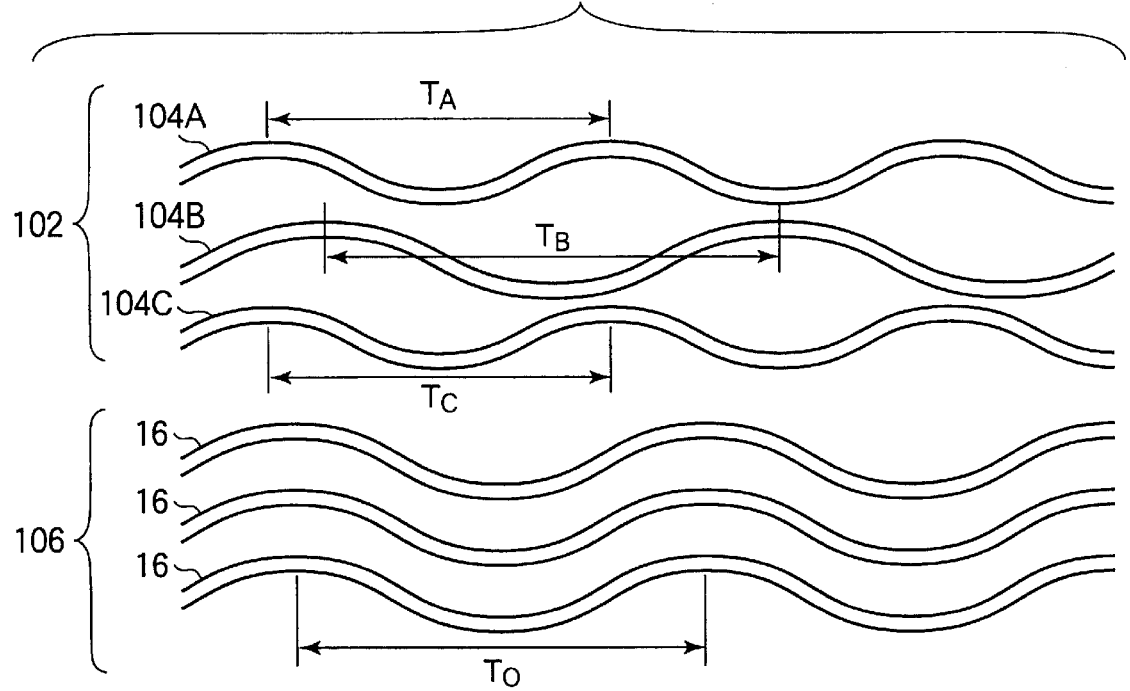
FIG. 6 is an enlarged schematic view illustrating the wobble on which various information are recorded on the optical recording medium of the present invention.

For example, as shown in FIG. 6, the recording by the use of the above described wobble is performed by modulating the wobble in grooves 104A to 104C in a read-in area 102 of an optical recording medium 10.

Figure 7:
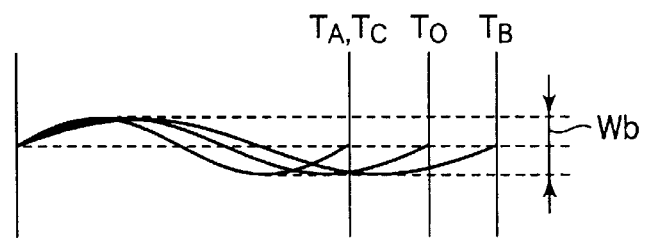
FIG. 7 is a diagram illustrating the relationship between wobble frequencies of the wobble and binary information.

Specifically, as shown in FIG. 7, without changing amplitude Wb of the wobble, wobble frequencies $T_A$, $T_B$ and $T_C$ of respective grooves are changed. For example, a wobble frequency $T_0$ of a groove 16 in a user area 106 shown in FIG. 6 is defined as a reference frequency and a wobble frequency $T_B$, which is longer than this reference frequency $T_0$, is mounted on a two-level signal indicating "1" and wobble frequencies $T_A$ and $T_C$, which are shorter than the reference frequency $T_0$, are mounted on a two-level signal indicating "0", so that the above described various information are recorded. Accordingly, for example, when the wobble frequencies are defined as "0", "1" and "0" counted from the inner periphery of the optical recording medium, it is indicated that this optical recording medium 10 is set to be used for the multi-level recording.

Alternatively, the above described predetermined information is defined as recording start position information and then, on the basis of this information, the recording of the information is set to be started from a predetermined position of the user area 106. This information also becomes the information of a starting position of a virtual recording cell 40.

Figure 8:
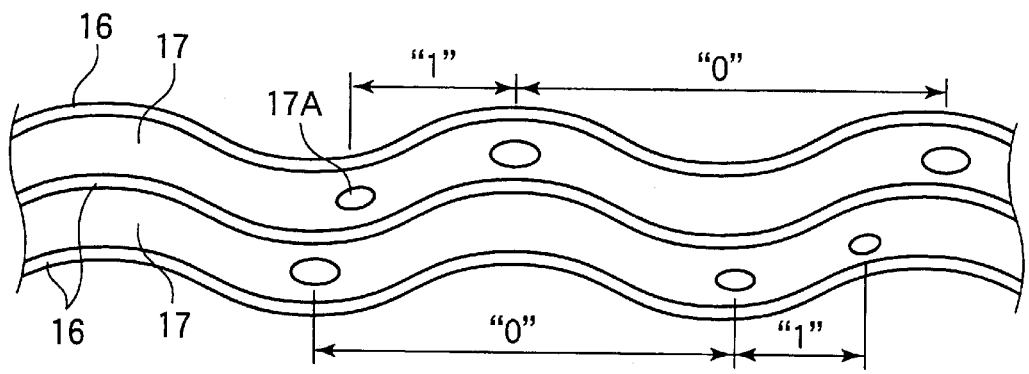
FIG. 8 is a schematic view illustrating the relationship between a binary information and a land pre-pit on which various information are recorded on the optical recording medium of the present invention.

Alternatively, according to other example of a recording method of the above described various information as shown in FIG. 8, the above described various information are mounted on a land pre-pit 17A, which has been formed in a land 17 between respective grooves 16, and then, for example, in the case that a frequency between the land pre-pits is short, the optical recording medium 10 binary records the information as "1" and in the case that a frequency between the land pre-pits is long, the optical recording medium 10 binary records the information as "0".

Figure 9:
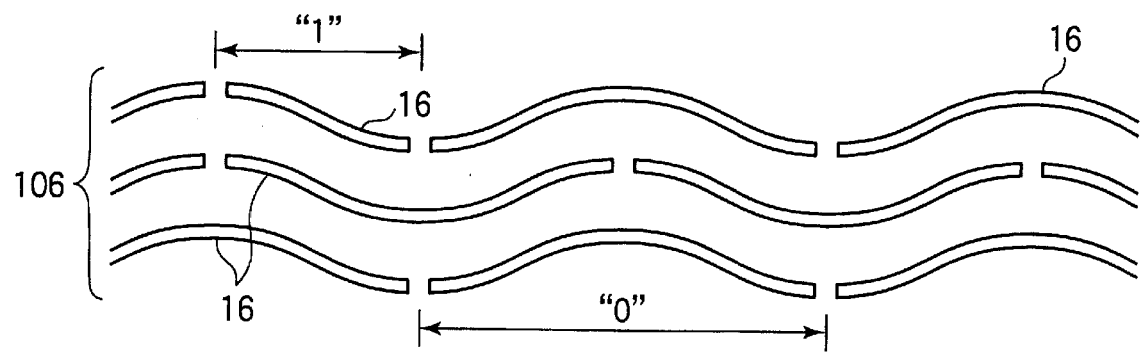
FIG. 9 is a schematic view illustrating the relationship between a binary information and a ceased length of the groove on which various information are recorded on the optical recording medium of the present invention.

Further, according to other example as shown in FIG. 9 or shown by reference numeral 56 in FIG. 1, the grooves 16 are ceased and then, for example, in the case that a ceased length of the groove is short, the optical recording medium 10 is controlled to indicate "1" and for example, in the case that it is long, the optical recording medium 10 is controlled to indicate "0".

By enabling the information recorded by the information recording means shown in the above described FIGS. 6, 8 and 9 also to be capable of being read by even a reading device of a conventional binary recording type, even if this multi-level optical recording medium is loaded in a reading and/or recording device of a binary recording type by mistake, this multi-level optical recording medium is easily identified as a multi-level type recording medium.

Figure 10:
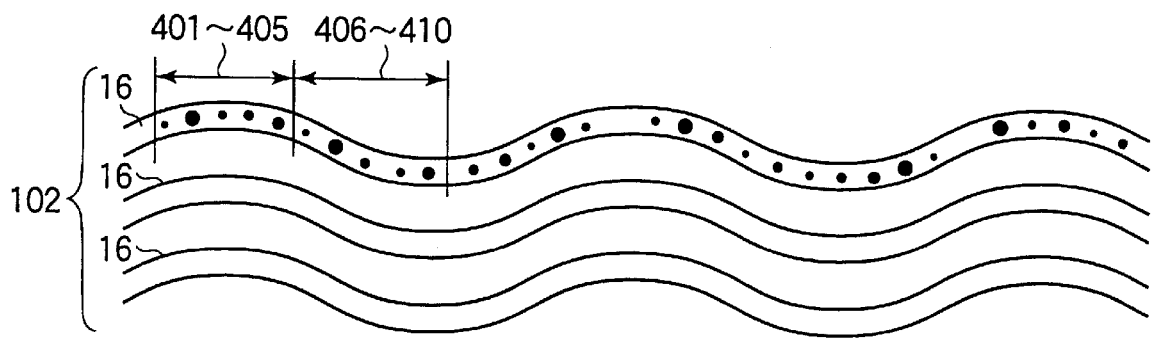
FIG. 10 is a schematic view illustrating the virtual recording cells and the recording marks on which various information are recorded on the optical recording medium of the present invention.

Further, for example, as shown in FIG. 10, it is possible to multi-level record the above described various information in the read-in area 102 in advance. In this case, in FIG. 10, it is possible to record the fact that this recording medium is a multi-level recording medium and the number of the stages of the multi-level recording by means of first five recording marks of virtual recording cells 401 to 405 and it is possible to record a recommended laser power for recording or reading or the like by means of next five virtual recording cells 406 to 410, respectively. These methods can be used alone or in combination.

EXAMPLES

First, the examples in the case of the laser irradiation time is modulated will be explained below.

The conditions of examples 1 to 4, described later, are given as follows.

Experiments on multi-level recording were carried out using as the optical recording medium 10 an optical recording medium based on a DDCD-R that employed a dye for the recording layer 12.

As a recording method, a DDU by PULSTEC (with a service laser of wavelength 784 nm), which is used to evaluate the recording of the DDCD-R, was connected with a high-frequency signal generator to perform recording.

A digital oscilloscope was connected to the DDU to perform reading evaluation.

To perform the multi-level recording, while the disc was being rotated at a constant linear speed of 3.6 m/sec (a quadruple speed for 0.9 m/sec provided by the DDCD standard), the laser driver was employed to change the irradiation time of a laser beam in six stages at a clock frequency of 4 MHz, or with 0.25 $\mu$sec of feed time for feeding a virtual recording cell 40. For reading, while the disc was being rotated at the constant linear speed, the disc was irradiated with a laser beam of 1 mW to detect a difference in the amount of reflected light from each virtual recording cell.

In this case, an objective lens with a numerical aperture of 0.55 was used, and the recording laser beam was tuned to be about 1.17 $\mu$m in diameter on the recording film. The virtual recording cell 40 was 0.35 cm in width, which was equal to that of the groove, and 1.2 $\mu$m (4.8 m/4M) in length, supposing that 4 million virtual recording cells were formed on a groove of 4.8 m through its length.

Furthermore, the jitter value of the signals recorded at this time was taken and measured by means of a digital oscilloscope LC-534EL manufactured by Le Croy, and a good result was obtained.

The jitter value depends on the shape of the recording mark formed on the organic dye recording film to be irradiated with a laser beam. Lower jitter values are indicative of positive formation of the aforementioned recording mark. This is also indicative of positive recording of information, thus making it possible to perform positive reading as well.

With the device used for this experiment for measuring jitter values, it can be said that jitter values of 10% or less are indicative of good recording, in consideration of the case in which recording is performed by the conventional binary recording and reading method.

Example 1

A cyanine dye was dissolved in a fluoridated alcohol to prepare a 2% coating solution for forming an organic dye recording layer. The coating solution was applied to the surface, having pre-grooves formed thereon, of an optically transparent substrate, 120 mm in diameter and 1.2 mm in thickness, by spin coating at rotational speeds from 200 rpm to 5000 rpm to form an organic dye recording layer about 200 nm in thickness from the bottom of the pre-groove. Here, the substrate is made of a polycarbonate resin (PANLITE AD5503 by TEIJIN CHEMICALS LTD). The pre-groove is formed in the shape of a spiral (the pre-groove 1.1 μm in track pitch, 0.35 μm in width, and 0.18 μm in depth) by injection molding on the surface of the substrate.

Then, an optically reflective layer of Ag was formed about 100 nm in thickness on the organic dye recording layer by sputtering. Then, an ultraviolet curable resin (SD318 by Dainippon Ink Kagaku Kogyo) was applied by spin coating to the optically reflective layer at rotational speeds from 300 rpm to 4000 rpm. After the coating, the coated film was irradiated from above with a beam of ultraviolet light emitted from a high-pressure mercury-vapor lamp to form a protective layer having a layer thickness of 10 μm.

The multi-level recording according to the present invention was attempted using the optical recording medium obtained as such.

The laser beams employed for recording were provided in six stages each with an irradiation time of (1) 50 nsec, (2) 80 nsec, (3) 110 nsec, (4) 140 nsec, (5) 170 nsec, and (6) 200 nsec at the laser beam power was 14 mw. Upon recording, a single signal was recorded on a circumference of the disc at each irradiation power.

The optical reflectivity of the virtual recording cell was 72% (0.72) at the initial stage and 20% (0.20) at the minimum limit stage after laser irradiation of 200 nsec and more. The optical reflectivity variation was 0.52.

The laser irradiation time was 50 nsec for decreasing the optical reflectivity of the virtual recording cell with 20% amount (about 0.1) of the optical reflectivity variation from the initial optical reflectivity, and, 200 nsec for decreasing the optical reflectivity of the virtual recording cell with 80% amount (about 0.42) thereof.

With this optical recording medium, six stages of multi-level recording were achieved, and the recorded data were positively read. Incidentally, the jitter values of the aforementioned recording marks (1) to (6) on this medium are shown in the table below. The table shows that a good evaluation of 10% or less is obtained for all the recording marks.

In addition, the jitter values were at the same level as in the case where the conventional binary recording was performed on the current CD-R. Further, the jitter values and the error values were better than in the comparative examples as in the case where the binary recording was performed on the current DDCD-R. This indicates that the so-called teardrop shaped recording mark is prevented from being formed. This indicates that the so-called teardrop shaped recording mark is prevented from being formed.

The length of the recording mark at the longest laser irradiation time was about 0.8 μm which was 1.3 times as long as the shortest recording mark and much shorter than the longest recording mark in the DDCD specifications.

This indicates that the maximum laser irradiating time is shorter than the time for forming the so-called teardrop shaped recording mark.

Next, the examples in the case of the laser irradiation power will be explained below.

The conditions of examples 5 to 7 and a comparative example 1, described later, are given as follows.

Experiments on multi-level recording were carried out using as the optical recording medium 10 an optical recording medium based on a DDCD-R that employed a dye for the recording layer 12.

As a recording method, a DDU by PULSTEC (with a service laser of wavelength 784 nm), which is used to evaluate the recording of the DDCD-R, was connected with a high-frequency signal generator and an acoustic optical modulator (AOM) to perform recording.

A digital oscilloscope was connected to the DDU to perform reading evaluation.

To perform the multi-level recording, while the disc was being rotated at a constant linear speed of 3.6 m/sec (a quadruple speed for 0.9 m/sec provided by the DDCD standard), the AOM was employed to change the irradiation power of a laser beam in six stages at a clock frequency of 4 MHz, or with 0.25 μsec of feed time for feeding a virtual recording cell 40 and 0.15 μsec of laser beam irradiating time. For reading, while the disc was being rotated at the constant linear speed, the disc was irradiated with a laser beam of 1 mW to detect a difference in the amount of reflected light from each virtual recording cell.

In this case, an objective lens with a numerical aperture of 0.55 was used, and the recording laser beam was tuned to be about 1.17 μm in diameter on the recording film. The virtual recording cell 40 was 0.35 μm in width, which was equal to that of the groove, and 1.2 cm (4.8 m/4M) in length, supposing that 4 million virtual recording cells were formed on a groove of 4.8 m through its length.

Example 2

An optical recording medium was prepared in the entirely same manner as in Example 1 except that the cyanine used in Example 1 was changed to phthalocyanine and the applied solvent was changed to methyl cyclohexane to prepare a dye solution.

The power of a recording laser beam was set to 13 mW. The recording linear speed at this time was 3.6 m/s, the recording clock frequency was 4 MHz (250 nsec), and the irradiation times-of the recording laser beam were (1) 50 nsec, (2) 70 nsec, (3) 90 nsec, (4) 110 nsec, (5) 130 nsec, and (6) 150 nsec, respectively. Respective single signals were recorded along one round of the disc.

The initial reflectivity of the medium was 68% (0.68), having reached the limit minimum reflectivity of 22% (0.22) when the medium was irradiated with the laser beam 250 nsec or more. Therefore, the width of variation in reflectivity was 0.46 (=0.68–0.22).

The irradiation time required to reduce the reflectivity of the medium from the aforementioned initial reflectivity 0.68 by 20% of the width of variation in reflectivity (about 0.92) was 50 nsec. On the other hand, the irradiation time required to reduce the reflectivity of the medium by 80% of the width of variation in reflectivity (about 0.37) was 150 nsec.

In this optical recording medium where a multi-level recording of six stages has been accomplished, the recorded data were successfully read. The jitter values of the aforementioned record marks (1) to (6) of the medium are shown in the table below, where it can be seen that all the record marks provide good evaluations of 10% or less.

Example 3

An optical recording medium was prepared in the same manner as in Example 1 except that the dye solution of Example 1 was changed to a mixture of cyanine and an azo metal complex. The mixture ratio of the cyanine and azo metal complex was 50 to 50 in weight percent.

The power of a recording laser beam was set to 14 mW. The recording linear speed at this time was 3.6 m/s, the recording clock frequency was 4 MHz (250 nsec), and the irradiation times of the recording laser beam were (1) 20 nsec, (2) 56 nsec, (3) 92 nsec, (4) 128 nsec, (5) 164 nsec, and (6) 200 nsec, respectively. Respective single signals were recorded along one round of the disc.

The initial reflectivity of the medium was 70% (0.70), having reached the limit minimum reflectivity of 21% (0.21) when the medium was irradiated with the laser beam 250 nsec or more. Therefore, the width of variation in reflectivity was 0.49 (=0.70−0.21).

The irradiation time required to reduce the reflectivity of the medium from the aforementioned initial reflectivity 0.70 by 20% of the width of variation in reflectivity (about 0.10) was 20 nsec. On the other hand, the irradiation time required to reduce the reflectivity of the medium by 80% of the width of variation in reflectivity (about 0.39) was 200 nsec.

In this recording medium where a multi-level recording of six stages has been accomplished, the recorded data were successfully read. The jitter values of the aforementioned record marks (1) to (6) of the medium are shown in Table 1 below, where it can be seen that all the record marks provide good evaluations of 10% or less.

Example 4

An optical recording medium was obtained in the same manner as in Example 1 except that a lower protective layer (a dielectric layer), a AgInSbTe-based phase changing recording layer, an upper protective layer (a dielectric layer), and an Al alloy reflective layer were formed through sputtering on the optically transparent substrate having grooves about 0.05 $\mu$m in depth. This medium was subjected to a multi-level recording with a recording laser power of 10 mW.

The phase changing recording layer, irradiated with a laser beam turned ON and OFF and thereby suddenly heated up or cooled down, changes from a crystalline to amorphous state, resulting in a decrease in reflectivity. However, moving the layer while being irradiated with a laser beam allows the vicinity of the spot being irradiated with the laser beam to be gradually cooled down, thereby leading to gradual formation of a highly reflective portion. That is, a longer irradiation time can increase highly reflective portions. Such reflectivity control causes the reflectivity within the virtual cell to increase with increasing irradiation time of a laser beam in contrast to the recording dye layer.

In this example, the irradiation times of the laser beam were (1) 180 nsec, (2) 170 nsec, (3) 160 nsec, (4) 150 nsec, (5) 140 nsec, and (6) 130 nsec, respectively. Respective single signals were recorded along one round of the disc.

In this optical recording medium where a multi-level recording of six stages has been accomplished, the recorded data were successfully read. The jitter values of the aforementioned record marks (1) to (4) of the medium are shown in the table below, where it can be seen that all the record marks provide good evaluations of 10% or less.

The jitter values are at the same level as those provided by performing binary recording in a conventional manner on a current CD-RW. This means that the formation of a so-called teardrop recording mark has been prevented.

The aforementioned results are shown in Table 1.

TABLE 1

Laser irradiation time and jitter value of recorded signal (%)

| Jitter value (%) | Example 1 | Example 2 | Example 3 | Example 4 |
|---|---|---|---|---|
| Laser irradiation time (1) | 5.1 | 6.8 | 7.2 | 7.4 |
| Laser irradiation time (2) | 5.0 | 6.5 | 6.8 | 7.1 |
| Laser irradiation time (3) | 5.0 | 6.3 | 6.9 | 7.5 |
| Laser irradiation time (4) | 5.3 | 6.3 | 7.0 | 7.9 |
| Laser irradiation time (5) | 5.5 | 6.3 | 7.4 | 8.2 |
| Laser irradiation time (6) | 5.5 | 6.5 | 7.5 | 8.7 |

Example 5

A cyanine dye was dissolved in a fluoride alcohol to prepare a 2% coating solution for forming an organic dye recording layer. The coating solution was applied to the surface, having pre-grooves formed thereon, of an optically transparent substrate, 120 mm in diameter and 1.2 mm in thickness, by spin coating at rotational speeds from 200 rpm to 5000 rpm to form an organic dye recording layer about 200 nm in thickness from the bottom of the pre-groove. Here, the substrate is made of a polycarbonate resin (PANLITE AD5503 by TEIJIN CHEMICALS LTD). The pre-groove is formed in the shape of a spiral (the pre-groove 1.1 $\mu$m in track pitch, 0.35 $\mu$m in width, and 0.18 $\mu$m in depth) by injection molding on the surface of the substrate.

Incidentally, the optically transparent substrate used here has a discrimination signal and an information signal regarding the power of laser beams, the signals having been recorded thereon in advance. Here, the discrimination signal is indicative of that the optical recording medium is employed for multi-level recording.

Then, an optically reflective layer of Ag was formed about 100 nm in thickness on the organic dye recording layer by sputtering. Then, an ultraviolet curable resin (SD318 by Dainippon Ink Kagaku Kogyo) was applied by spin coating to the optically reflective layer at rotational speeds from 300 rpm to 4000 rpm. After the coating, the coated film was irradiated from above with a beam of ultraviolet light emitted from a high-pressure mercury-vapor lamp to form a protective layer having a layer thickness of 10 $\mu$m.

The multi-level recording according to the present invention was attempted using the optical recording medium obtained as such.

The laser beams employed for recording were provided in six stages each with an irradiation power of (1) 3.5 mW, (2) 5.6 mW, (3) 7.7 mW, (4) 9.8 mW, (5) 11.9 mW, and (6) 14 mW. Upon recording, a single signal was recorded on a circumference of the disc at each irradiation power.

Recording was carried out as described above and thereby six stages of multi-level recording were performed. Also detected and confirmed were the discrimination signal indicative of that the optical recording medium was used for multi-level recording and the information signal regarding the power of laser beams.

Furthermore, the jitter value of the signals recorded at this time was taken and measured by means of a digital oscilloscope LC-534EL manufactured by Le Croy, and a good result was obtained.

The jitter value depends on the shape of the recording mark formed on the organic dye recording film to be irradiated with a laser beam. Lower jitter values are indicative of positive formation of the aforementioned recording mark. This is also indicative of positive recording of information, thus making it possible to perform positive reading as well.

With the device used for this experiment for measuring jitter values, it can be said that jitter values of 10% or less are indicative of good recording, in consideration of the case in which recording is performed by the conventional binary recording and reading method.

Example 6

An optical recording medium was fabricated in the same way as in example 5 except for phthalocyanine dye used therefor. Using the optical recording medium obtained as such, multi-level recording was attempted in the same way as in the example 5. Consequently, the multi-level recording was accomplished. Also detected and confirmed were the discrimination signal indicative of that the optical recording medium was used for multi-level recording and the information signal regarding the power of laser beams.

Furthermore, the jitter value of the signals recorded then was measured likewise, providing a good result.

Example 8

An optical recording medium was fabricated in the same way as in example 5 except for azo dye used therefor. Using the optical recording medium obtained as such, multi-level recording was attempted in the same way as in the example 1. Consequently, the multi-level recording was accomplished. Also detected and confirmed were the discrimination signal indicative of that the optical recording medium was used for multi-level recording and the information signal regarding the power of laser beams.

Furthermore, the jitter value of the signals recorded then was measured likewise, providing a good result.

Example 9

An optical recording medium was obtained in the same manner as in the example 5 except that a lower protective layer (a dielectric layer), an AgInSbTe-based phase changing recording layer, an upper protective layer (a dielectric layer), and an Al alloy reflective layer were formed by sputtering on an optically transparent substrate having grooves about 0.05 μm in depth. The multi-level recording was performed on this medium.

Like the dye, the phase changing recording layer, irradiated at an increased laser irradiation power, is provided with a recording mark increased in width and a reduced reflectivity.

In this example, the irradiation powers of the laser were (1) 8.5 mW, (2) 9.5 mW, (3) 10.5 mW, (4) 11.5 mW, (5) 12.5 mW, and (6) 13.5 mW. Incidentally, each single signal was recorded on a circumference of the disc.

With this optical recording medium, six stages of multi-level recording were achieved, and the recorded data were positively read. Incidentally, the jitter values of the aforementioned recording marks (1) to (4) on this medium are shown in the table below. The table shows that a good evaluation of 10% or less is obtained for all the recording marks.

In addition, the jitter values were at the same level as in the case where the conventional binary recording was performed on the current CD-RW. This indicates that the so-called teardrop shaped recording mark is prevented from being formed.

The aforementioned results are shown in Table 2.

TABLE 2

Laser irradiation power and the jitter value of the signal recorded (%)

| Each jitter value (%) | Example 5 (Cyanine) | Example 6 (Phthalo-cyanine) | Example 7 (Azo) | Example 8 (Phase changing) |
|---|---|---|---|---|
| Laser power (1) | 7.2 | 7.4 | 7.4 | 7.7 |
| Laser power (2) | 7.1 | 7.2 | 7.3 | 7.5 |
| Laser power (3) | 7.0 | 7.1 | 7.2 | 7.4 |
| Laser power (4) | 7.3 | 7.0 | 7.3 | 7.6 |
| Laser power (5) | 7.4 | 7.3 | 7.3 | 7.7 |
| Laser power (6) | 7.5 | 7.5 | 7.4 | 7.8 |

Comparative Example 1

The binary recording that is employed for the current CD-R was performed on an optical recording medium fabricated in the same way as in the examples 1 and 5. The laser beam power employed upon recording was 14 mW and the recording linear velocity was 3.6 m/s.

Incidentally, in this case, the time taken is about 220 nsec for the shortest recording mark (3T) and about 860 nsec for the longest recording mark (11T).

Other recording conditions were employed in accordance with the CD-R standards "Recordable Compact Disc Systems PART II: CD-R Version 3.1".

The jitter value provided then was measured from 3T to 11T, and it was found that the jitter value was deteriorated upon forming long marks as shown in Table 3. This also caused the jitter value of the entire optical recording medium to deteriorate and the error value to deteriorate as well.

Signal length and jitter value of signals recorded (%)

TABLE 3

| Each jitter value (%) | Comparative example 1 | Comparative example 2 |
|---|---|---|
| Signal length 3T | 7.2 | 8.2 |
| Signal length 4T | 7.5 | 8.6 |
| Signal length 5T | 7.9 | 9.1 |
| Signal length 6T | 8.3 | 9.2 |
| Signal length 7T | 9.6 | 9.7 |
| Signal length 8T | 12.7 | 11.3 |
| Signal length 9T | 19.1 | 14.9 |
| Signal length 10T | 23.5 | 16.3 |
| Signal length 11T | 27.7 | 19.5 |

In this phenomenon, longer marks recorded along the groove formed are irradiated continuously with a laser beam. Thus, due to the accumulation of heat produced by the laser beam in addition to the narrow track pitch, formed are marks larger in length and width than those that are originally recorded. This causes jitters or errors to increase.

Comparative Example 2

The binary recording that is employed for the current CD-RW was performed on an optical recording medium fabricated in the same way as in the examples 4 and 8. The laser beam power employed upon recording was 10 mW and the recording linear velocity was 3.6 m/s. Incidentally, in this case, the time taken is about 220 nsec for the shortest recording mark (3T) and about 860 nsec for the longest recording mark (11T).

Other recording conditions were employed in accordance with the CD-RW standards "Recordable Compact Disc Systems PART III: CD-RW Version 2.0".

The jitter value provided then was measured from 3T to 11T, and it was found that the jitter value was deteriorated upon forming long marks as shown in Table 2. This also caused the jitter value of the entire optical recording medium to deteriorate and the error value to deteriorate as well.

The laser operates in a pulse mode. However, in this phenomenon, due to the accumulation of heat produced by the laser beam in addition to the narrow track pitch, longer marks recorded along the groove formed cause larger marks to be formed in comparison with the length and width of the marks that are originally recorded. This causes jitters or errors to increase.

According to the present invention, in comparison with the case in which the conventional binary recording is performed on the track having a narrow pitch in accordance with the DDCD standards, the multi-level recording of five stages or more makes the longest recording mark less in length and would not cause a so-called teardrop recording mark to be formed. Accordingly, the present invention provides a good effect of making it possible to reduce the diameter of the laser recording spot and thereby perform recording at a high density without involving the occurrence of cross-talk or the like.

In addition, several types of pit trains having different depths are formed in advance or multi-level recording is performed in advance. This makes it possible to read, upon reading on the optical recording medium, the particular information of the portion, or the information for identifying the optical recording medium and the information regarding the amount of light of the laser beam for recording and reading on the optical recording medium.

Furthermore, the present invention provides a recording method for irradiating an optical recording medium, having a recording layer, with a laser beam in five stages or more of the irradiation time and/or power to perform multi-level recording of the data made available for recording. The method makes it possible to perform multi-level recording in five stages or more in reflectivity of the recording layer.

What is claimed is:

1. An optical recording medium for recording information by irradiating a recording layer with a laser beam to form a recording mark thereon and for reading recorded information by irradiating the recording mark with a reading laser beam, said optical recording medium comprising a virtual recording cell set contiguously on said recording layer along a track in a direction of relative displacement between the laser beam and said recording layer, the virtual recording cell being provided with a given unit length in the direction and a unit width in a direction orthogonal thereto, the track being provided with a track pitch defined to be 1 $\mu$m to 1.5 $\mu$m in the orthogonal direction, wherein a recording mark can be formed on said recording layer in the virtual recording cell, said recording mark having at least different one of a size and an optical transmittance corresponding to five stages or more of modulation of at least one of an irradiation time and an irradiation power of the laser beam, and optical reflectivity of the entire virtual recording cell is modulated to thereby enable multi-level recording of information in five stages or more in accordance with at least one of an area ratio of the recording mark to the virtual recording cell and an optical transmittance of the recording mark.

2. The optical recording medium according to claim 1, wherein the unit length of said virtual recording cell is set to be generally equal to the length of a recording mark formed by a laser beam irradiation with at least one of a maximum irradiation time and a maximum irradiation power.

3. The optical recording medium according to claim 1, wherein a groove for guiding a laser beam is provided along said recording layer, said virtual recording cell is set in said groove, and said unit width is set to be generally equal to the width of said groove.

4. The optical recording medium according to claim 1, wherein said unit length of said virtual recording cell is made equal to or less than a beam waist of said reading laser beam.

5. The optical recording medium according to claim 1, wherein multi-level recording of information is performed in advance on a portion of said recording layer.

6. The optical recording medium according to claim 1, wherein particular information indicative of being a multi-level recording medium is recorded on at least one of said virtual recording cell, a portion having the multi-level recording performed thereon and a wobble.

7. The optical recording medium according to claim 1, wherein a groove for guiding a laser beam is provided along said recording layer, and the groove is partly discontinued.

8. The optical recording medium according to claim 1, wherein said recording layer is formed of an organic dye.

9. The optical recording medium according to claim 1, wherein the unit width of said virtual recording cell is so set as to allow recording to be performed on the recording layer when the recording layer is irradiated with a laser beam of wavelength 780 nm via an objective lens having a numerical aperture of 0.55 or more with said spot diameter being 1.2 $\mu$m or less.

10. The optical recording medium according to claim 1, wherein said virtual recording cell is arranged in a spiral fashion with a track pitch being from 1 $\mu$m to 1.5 $\mu$m and formed in a disc shape as a whole.

11. An optical recording method for recording information by irradiating a recording layer with a laser beam, while one of the recording layer and the laser beam is displaced in a given direction relative to the other, to form a recording mark, comprising the steps of:

defining a virtual recording cell being set contiguously on said recording layer in the direction of relative displacement, the virtual recording cell being set to be generally equal to the width of a groove formed at a track pitch of 1 $\mu$m to 1.5 $\mu$m in a direction orthogonal to the direction of displacement, modulating the irradiation power of the laser beam in five stages or more for each virtual recording cell, and performing multi-level recording of information by changing a size of the recording mark formed within the virtual recording cell to modulate the optical reflectivity of said entire virtual recording cell in accordance with at least one the irradiation time and the irradiation power of said laser beam, said optical reflectivity being provided by at least one of an area ratio of the recording mark to the virtual recording cell and an optical transmittance of the recording mark.

12. The optical recording method according to claim 11, wherein
said recording layer is formed of a material for allowing at least one of the size and optical transmittance of the recording mark to be modulated only in accordance with the irradiation time provided when said beam diameter of the laser beam is made generally constant, and said recording layer is irradiated with the laser beam having a constant beam diameter.

13. The optical recording method according to claim 11, wherein
said recording layer is formed of a material for allowing at least one of the size and optical transmittance of the recording mark to be modulated only in accordance with the irradiation power provided when said beam diameter of the laser beam is made generally constant, and said recording layer is irradiated with the laser beam having a constant beam diameter.

14. The optical recording method according to claim 11, wherein
said laser beam is a beam of light provided with a wavelength of 780 nm, and said recording layer is irradiated with said laser beam via an objective lens having a numerical aperture of 0.55 or more.

* * * * *